United States Patent
Robbins et al.

(10) Patent No.: US 8,024,459 B2
(45) Date of Patent: Sep. 20, 2011

(54) SYSTEMS AND METHODS FOR MONITORING A REMOTE NETWORK

(75) Inventors: Robert J. Robbins, Independence, OH (US); Eddy H. Wright, Independence, OH (US)

(73) Assignee: Eddy H. Wright, Independence, OH (US)

(*) Notice: Subject to any disclaimer, the term of this patent is extended or adjusted under 35 U.S.C. 154(b) by 191 days.

(21) Appl. No.: 12/123,027

(22) Filed: May 19, 2008

(65) Prior Publication Data

US 2009/0287815 A1 Nov. 19, 2009

(51) Int. Cl.
*G06F 15/173* (2006.01)
(52) U.S. Cl. ........ 709/224; 709/203; 709/225; 709/227; 370/401
(58) Field of Classification Search ............... 709/203, 709/224, 225, 227; 370/401
See application file for complete search history.

(56) References Cited

U.S. PATENT DOCUMENTS

| | | | |
|---|---|---|---|
| 6,505,248 B1* | 1/2003 | Casper et al. | 709/224 |
| 6,515,967 B1* | 2/2003 | Wei et al. | 370/244 |
| 6,560,611 B1* | 5/2003 | Nine et al. | 707/104.1 |
| 2003/0046584 A1* | 3/2003 | Laksono | 713/201 |
| 2006/0173997 A1* | 8/2006 | Tullberg et al. | 709/224 |
| 2006/0218267 A1* | 9/2006 | Khan et al. | 709/224 |
| 2007/0060186 A1* | 3/2007 | Ganesan et al. | 455/522 |
| 2007/0150581 A1* | 6/2007 | Banerjee et al. | 709/224 |
| 2008/0082661 A1* | 4/2008 | Huber | 709/224 |
| 2008/0109870 A1* | 5/2008 | Sherlock et al. | 726/1 |
| 2008/0148099 A1* | 6/2008 | Bhat et al. | 714/25 |
| 2009/0067394 A1* | 3/2009 | Van Wingerde | 370/338 |
| 2009/0112626 A1* | 4/2009 | Talbot et al. | 705/3 |

* cited by examiner

*Primary Examiner* — Wing Chan
*Assistant Examiner* — Hitesh Patel
(74) *Attorney, Agent, or Firm* — Eschweiler & Associates, LLC (57) ABSTRACT

One embodiment relates to a method for monitoring a remote network over the Internet. In the method, a monitoring request from a client is received from over the Internet at a server. The server transmits a relayed monitoring request over the Internet to a remote network monitor. The remote network monitor is adapted to passively monitor the remote network based on the monitoring request, thereby detecting whether an unfavorable communication condition is met the remote network.

4 Claims, 9 Drawing Sheets

SYSTEMS AND METHODS FOR MONITORING A REMOTE NETWORK

FIELD

The present invention relates generally to communication networks and more particularly to methods and systems for monitoring a remote network.

BACKGROUND

In today's business climate, industry fortunes rise and fall on whether information is exchanged in an efficient manner. For example, cell phones, pagers, and the Internet have thrived because each technology allows businesses to exchange information at a moment's notice over a network. As networks become more integrated into today's society, the networks are also becoming more complex.

While an increase in complexity may provide networks with greater range and more flexibility, it also causes some difficulties. For example, when a complex network experiences faults or data errors, it may be extremely difficult to diagnose the location of the faults. While a network technician or IT professional may be able to diagnose the cause of the faults if he or she has direct access to the network, diagnosing the fault becomes even more difficult if the fault occurs at a remote location.

For example, consider a scenario where an investment company has a large private network that includes several remote network sites, where an IT professional is not present at these remote network sites. To diagnose a fault or data error on a remote network, the investment company sends an IT professional to the particular remote network experiencing the fault. After arriving at the remote network, the IT professional manually connects a test apparatus to the remote network to perform any desired tests. In some instances, the IT professional will determine that the cause of the problem lies in the remote network itself and will attempt to correct the problem. In other instances, however, the IT professional will find that the fault is not in the remote network itself, but rather is in the public network to which the remote network is connected. In this instance, the IT professional will be unable to correct the fault because the public network is likely owned by a telecommunications company or some other entity. Therefore, the IT professional does not have access to this equipment and/or is not authorized to repair it. Thus, many times the IT professional's trip is a waste, resulting in squandered expenditures for the investment company.

As the inventors have appreciated, it is desirable to have a remote network monitoring system that allows for efficient diagnosis of faults in a remote network.

SUMMARY

The following presents a summary to provide a basic understanding of one or more aspects of the disclosure herein. This summary is not an extensive overview. It is intended neither to identify key or critical elements nor to delineate scope of the disclosure herein. Rather, its primary purpose is merely to present one or more aspects in a simplified form as a prelude to a more detailed description that is presented later.

One embodiment relates to a method for monitoring a remote network over the Internet. In the method, a monitoring request from a client is received from over the Internet at a server. The server transmits a relayed monitoring request over the Internet to a remote network monitor. The remote network monitor is adapted to passively monitor the remote network based on the monitoring request, thereby detecting whether an unfavorable communication condition occurs on the remote network.

The following description and annexed drawings set forth certain illustrative aspects. Other aspects, advantages and/or features may, however, become apparent from the following detailed description when considered in conjunction with the annexed drawings.

DETAILED DESCRIPTION

The present invention will now be described with reference to the drawings wherein like reference numerals are used to refer to like elements throughout, and wherein the illustrated structures are not necessarily drawn to scale.

Figure 1:
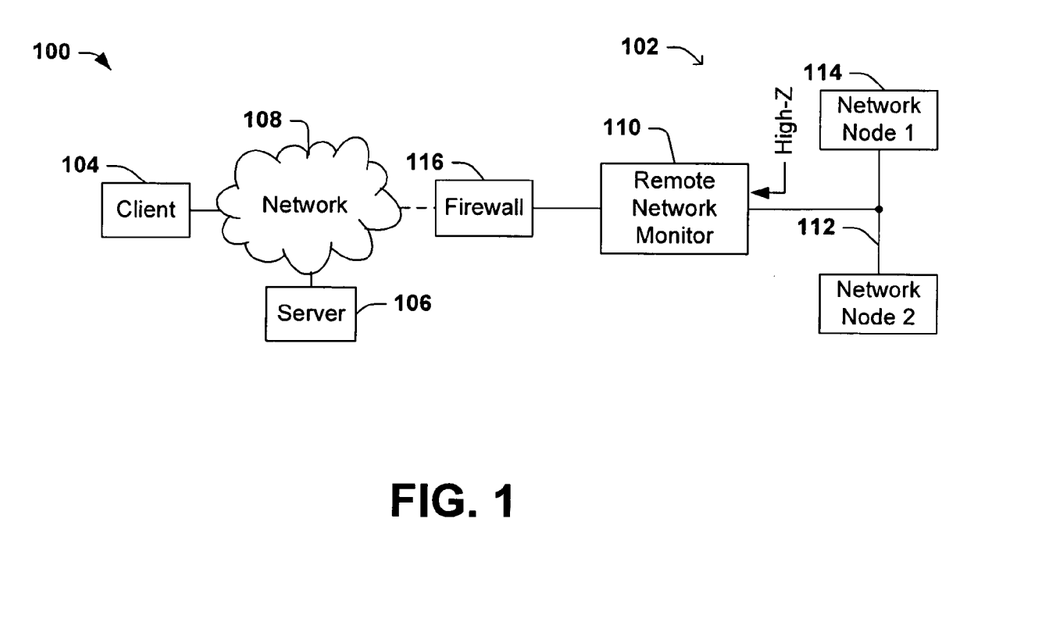
FIG. 1 illustrates a system for monitoring a remote network in accordance with some aspects of the present invention.

FIG. 1 depicts a system 100 for monitoring a remote network 102 in accordance with some aspects of the present invention. As shown, the system 100 includes a client 104 that can establish a connection with a server 106 through a network 108, such as the Internet or a private intranet. After establishing a connection with the server 106, the client 104 can communicate (via the server 106) with a remote network monitor 110 that passively monitors a communication medium 112 of the remote network 102. By passively monitoring without transmitting signals onto the medium 112, the remote network monitor 110 can determine whether an unfavorable communication condition exists in the remote network 102. The remote network monitor 110 can then report back to the client, thereby allowing the client 104 to remedy the unfavorable condition.

By making the remote network monitor 110 accessible to the client 104 via the server 106, the system 100 can monitor and/or test the remote network communications through firewalls (e.g., 116) and Dynamic Host Configuration Protocol (DHCP) servers which assign Internet protocol (IP) addresses dynamically. Note that although FIG. 1 shows a client/server architecture, aspects of the invention are also applicable to peer-to-peer architectures, where the client 104 and remote network monitor 110 communicate directly (i.e., without the server 106). Typically in a peer-to-peer architecture, the client 104 is associated with a first static IP address and the remote network monitor 110 is associated with a second static IP address.

Figure 2:
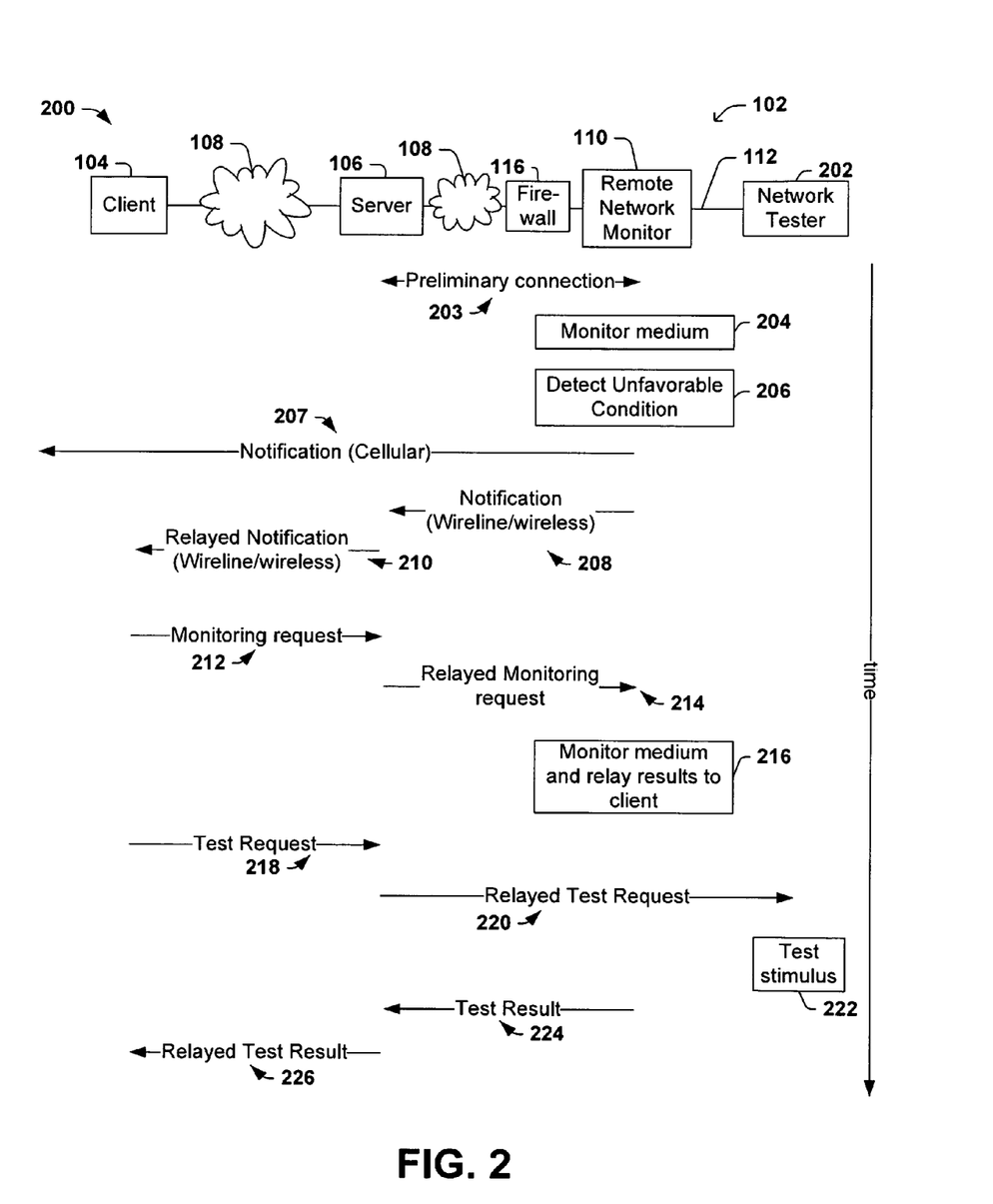
FIG. 2 illustrates a communication diagram for monitoring a remote network in accordance with some aspects of the present invention.

To show a slightly more detailed example of one manner in which the system 100 can function, FIG. 2 shows a communication diagram 200 where client 104 cooperatively uses the remote network monitor 110 and a dedicated network tester 202 (e.g., network node 114) to perform tests on the remote network 102. Although this example illustrates a system where both the remote network monitor 110 and dedicated network tester 202 engage in server-mediated communication, in other embodiments this is not necessary. For example, the remote network monitor 110 or the dedicated network tester 202 could operate in peer-to-peer mode or could use different servers for communication. In addition, other methods will also be discussed further herein (see e.g., FIGS. 7, 8 and 10), and it will be appreciated that this communication diagram 200 is merely one example of how the system 100 could function.

As shown in FIG. 2, the communication diagram 200 starts with the remote network monitor 110 sending a preliminary connection 203 to the server 106. In some respects, this can be thought of as the remote network monitor "logging in" to the server.

If the remote network monitor 110 communicates with the server 106 over a wireline connection, the preliminary connection 203 can setup an on-going connection with a very low data rate between the server 106 and remote network monitor 110. Because the preliminary connection 203 originates from the remote network monitor 110 (i.e., inside the remote network 102), this will allow the server 106 and remote network monitor 110 to communicate even if a firewall is in place in the remote network 102. By comparison, if the server attempted to send an unprompted preliminary connection to the remote network monitor 110, the firewall 116 in the remote network would reject this unprompted request. In addition, because the preliminary connection 203 is on-going, the remote network monitor 110 and server 106 can communicate when DHCP servers might otherwise assign the remote network monitor to another IP address if the connection was inactive for a significant time.

If the remote network monitor 110 connects to the Internet and the server 106 via a cellular interface, the preliminary connection 203 is not required. The remote network monitor in that case is programmed with an electronic address (e.g., programmable cell phone number) for a customer in charge of the remote network 102. If the remote network monitor detects a network fault, the remote network monitor will be able to contact the customer via the electronic address.

In 204, the remote network monitor 110 autonomously and passively monitors 204 the communication medium 112. At some time during monitoring 204, the remote network monitor 110 detects an unfavorable communication condition 206. In some embodiments, the detection of the unfavorable communication condition 206 could be achieved by detecting erroneous cyclic redundancy check (CRC) bits, erroneous framing bits, erroneous bipolar violation, etc.

In 207, if the remote network monitor 110 uses a cellular interface, it sends a notification directly to the customer at the electronic address provided to it. Alternatively, it may send a notification via the server 106, as described in 208 using an electronic address such as an e-mail address.

In 208, the remote network monitor includes either a wireline interface or wireless interface and sends a notification 208 to the server 106. The server 106 then sends a relayed notification 210 to the client 104 to notify the client 104 of the unfavorable condition. In other un-illustrated embodiments, the notification 208 could be transmitted directly to a customer (e.g., network administrator) associated with the client 104. For example, the notification 208 could be a text message, instant message, pager message, email message, or voice message transmitted to the customer. In peer-to-peer embodiments, the notification 208 could be transmitted from the remote network monitor 110 directly to the client 104.

After the customer or client 104 receives the notification 207 or 210, the client 104 sends a monitoring request 212 to the server 106. The server 106 then sends a relayed monitoring request 214 to the remote network monitor 110, which establishes a connection between the client 104 and remote network monitor 110. At this time, the remote network monitor 110 passively monitors 216 the medium 112 and intermittently or continuously relays monitoring results to the client 104, often via the server 106.

The client 104 may then transmit a test request 218 to the server 106. The server then transmits a relayed test request 220 to the dedicated network tester 202. The network tester 202 then generates test stimulus 222 on the communication medium 112, where the test stimulus 222 is based on the test request 218.

Because the remote network monitor 110 is still passively monitoring the medium, the remote network monitor 110 will transmit a test result 224 to the client 104. Again, the test result 224 may be transmitted to the client 104 directly, but will more commonly be relayed to the client 104 via the server 106.

In this way, an IT professional can use the client 104 and remote network monitor 110 to passively monitor the remote network 102 from a remote geographic location. By strategically performing tests, the IT professional can determine whether a fault is present, and if so, can assess whether the fault is due to a problem within the remote network 102 or is due to a problem off of the remote network (e.g., in Telecommunications Company equipment). Because this testing is initiated remotely, the owner of the remote network 102 can save considerable time and expense associated with maintaining the remote network 102.

To facilitate the desired functionality, the remote network monitor 110 has at least two interfaces, namely: a client/server interface that is designed to communicate with the client 104 and/or server 106; and a remote network interface that is designed to passively monitor the communication medium 112. Depending on the implementation, the remote network interface could be an optical fiber interface, a coaxial cable interface, a twisted pair of copper wires interface, a power line interface, a wireless interface, or any other interface. Often the remote network interface has a high impedance to ensure that the passive monitoring does not cause a network fault. For example, in some embodiments the remote network interface could have an impedance that is at least twice the characteristic impedance of the transmission line to which the remote network interface is coupled. Thus, this impedance could be approximately 100 ohms, approximately 500 ohms, approximately 1000 ohms, or more, depending on the implementation.

The server 106 also may include several different interfaces. For example, in various embodiments the server could include a client network interface for interfacing with the client 104, a remote network monitor interface for communicating with the remote network monitor 110, and optionally a network tester interface for communicating with the dedicated network tester 202.

Figure 3:
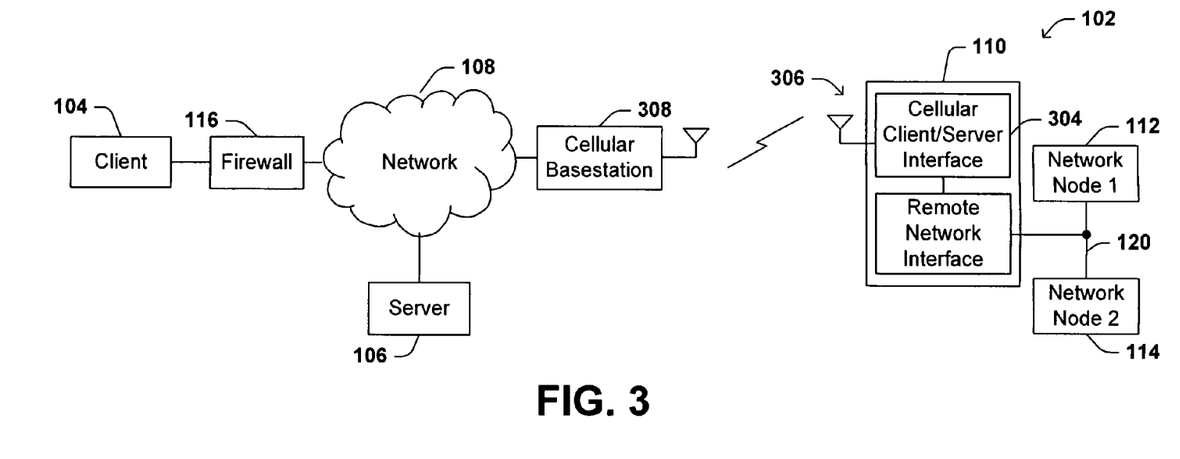
FIG. 3 shows a system for monitoring a remote network by using a remote network monitor with a cellular client/server interface.

Referring now to FIG. 3, one can see a more detailed embodiment where a remote network monitor 110 includes a cellular client/server interface 304. The cellular client/server interface 304 is coupled to a cellular antenna 306 and is designed to facilitate communications with a cellular base station 308. Thus, the remote network monitor 110 may be accessed via a primary telephone number and optionally at least one secondary telephone number or address, all of which may be programmable. The cellular client/server interface 304 may be an invaluable tool for accessing an isolated remote network where the client 104 and/or server 106 are unable to otherwise access the remote network monitor 110. For example, if a government group has a remote network that consists of secure computers that are not coupled to the Internet, the cellular client/server interface 304 may allow the client 104 and/or server 106 to connect to the remote network monitor 110, thereby facilitating performance monitoring of the remote network.

Figure 4:
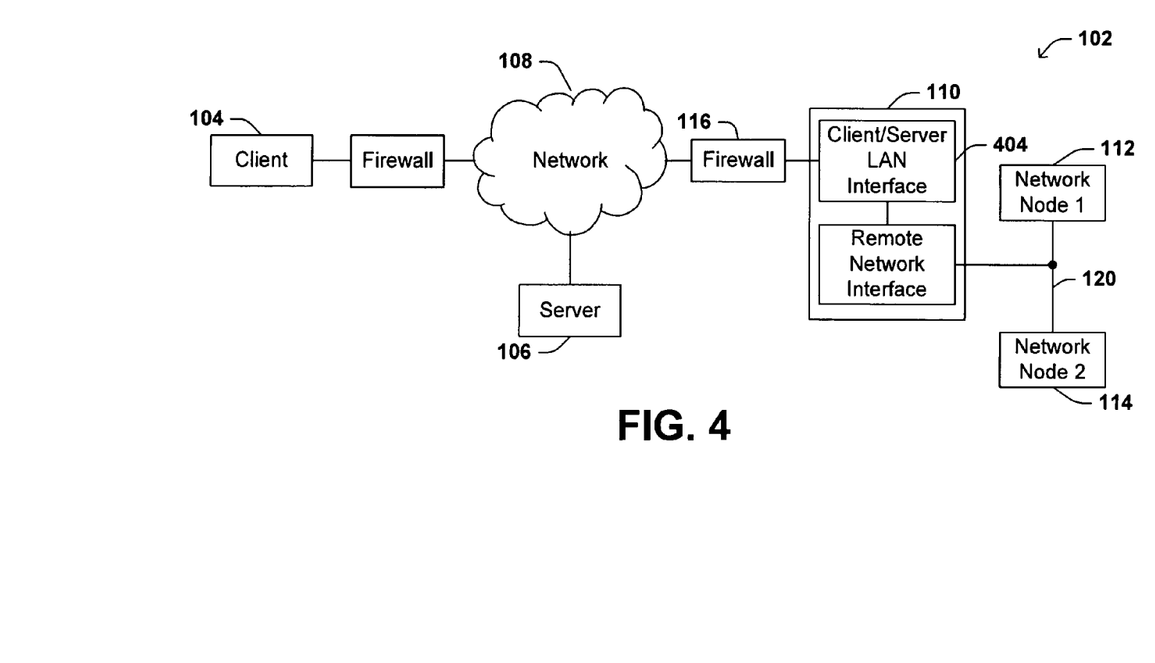
FIG. 4 shows a system for monitoring a remote network by using a remote network monitor with a local area network (LAN) client/server interface.

FIG. 4 depicts another embodiment where a remote network monitor 110 has a wireless or wireline local area network (LAN) client/server interface 404 for communicating with the client 104 and/or server 106. Thus, instead of being accessible via a unique phone number as in FIG. 3's embodiment, the remote network monitor 110 is accessible via a unique network node identifier (e.g., IP address). As will be appreciated further below, this embodiment is often useful for diagnosing whether a network fault is caused at a customer's premises (CPE) or outside of the CPE (e.g., on a telecommunication company's equipment).

Figure 5:
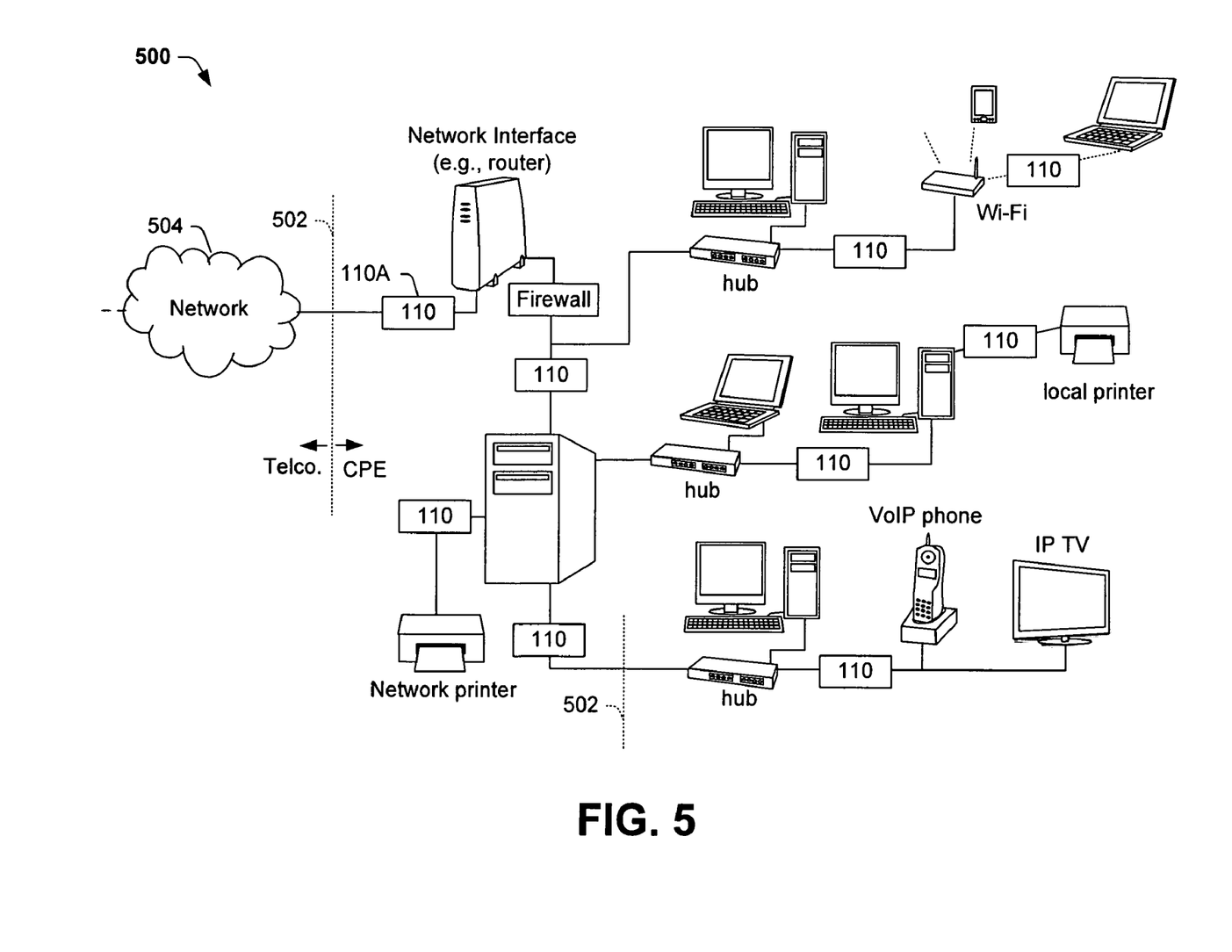
FIG. 5 shows a more detailed embodiment of a remote network with remote network monitors having a mixture of remote network interfaces.

To understand this diagnostic capability in greater detail, FIG. 5 shows a more detailed example of a remote network 500 where a number of remote network monitors 110 have been strategically arranged. A demarcation line 502 may indicate the boundary separating the CPE (components owned by customer) from a public network 504 (likely owned at least in part by telecommunications company (Tel. Co.)), or may indicate the boundary between nodes within the network. Consider a scenario where a data error is experienced in the remote network 500, but where the customer is unable to easily determine whether the error arises in the CPE or on the public network 504. By strategically arranging a remote network monitor 110A on the edge of the CPE near the demarcation line 502, the customer can determine whether the fault is due to a problem at the CPE or the public network. After diagnosing the fault, the customer can then take the appropriate action without having to dispatch an IT professional to manually test the remote network 500. If the fault is due to a problem on the public network 504, the remote network monitors 110 may save the user considerable time and expense.

Figure 6:
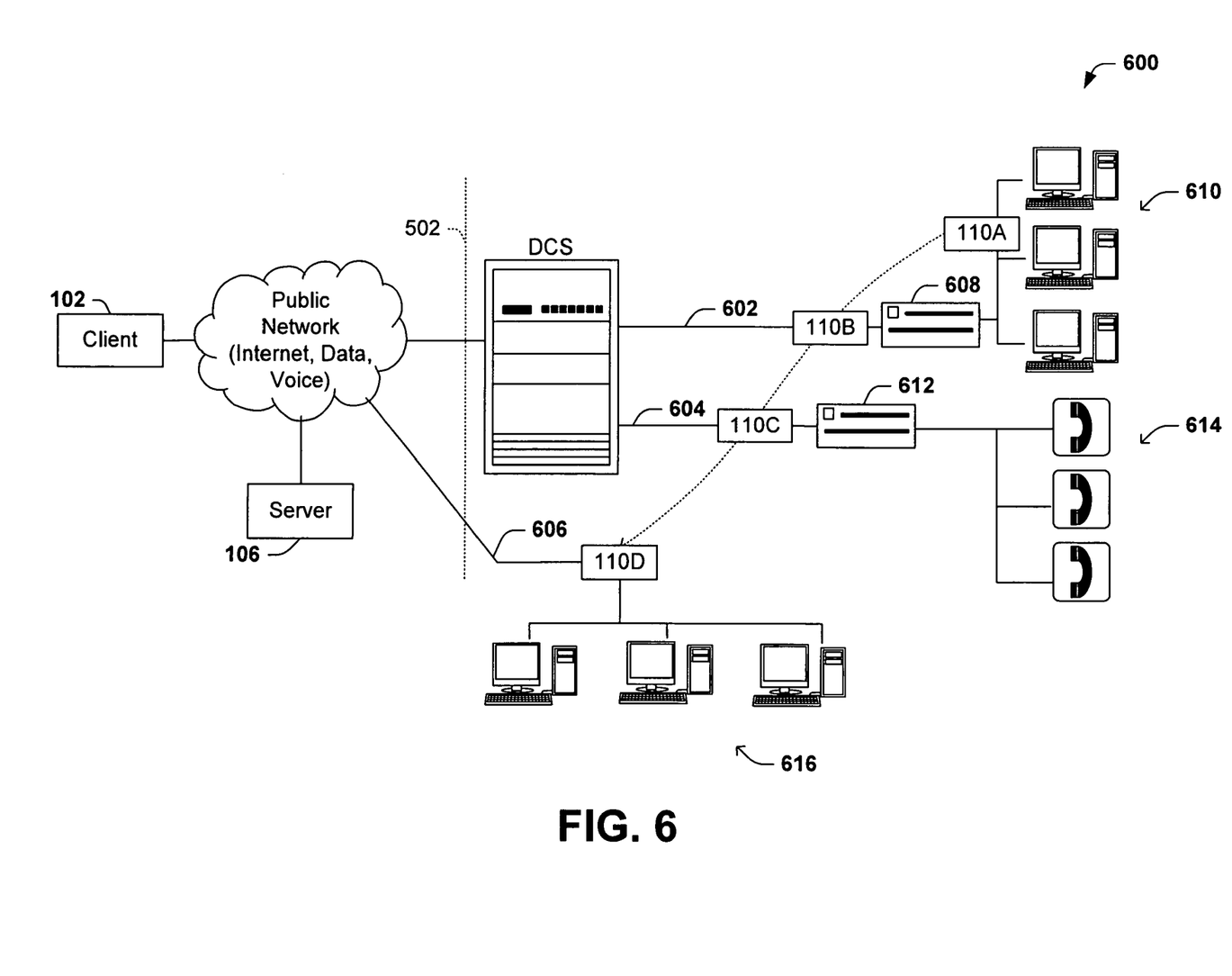
FIG. 6 shows a system for monitoring a remote network by using a number of remote network monitors that are daisy-chained together sharing a single communications link 606.

In some embodiments, a number of remote network monitors 110 are daisy-chained together to monitor a remote network. The client then communicates with several or all of the remote network monitors via a single remote network monitor. For example, FIG. 6 depicts a remote network 600 that includes multiple communication lines (602, 604, 606), such as T1, T3 or DS3 lines, that deliver communication data to extensions (e.g., phones, modems, faxes, etc) at a number of different facilities. The first and second communication lines 602, 604 stem from a public telephone network (PTN) that delivers high-speed data, such as SONET data, to a Digital Cross-connect System (DCS) at the CPE. The DCS switches circuits to selectively deliver communication data along the first and second communication lines 602, 604. The first communication line 602 is coupled to router 608, which is dedicated to delivering network data, such as Ethernet packets to a first facility 610. The second communication line 604 is coupled to a PBX unit 612, which is dedicated to delivering telephony data to a second facility 614. A third communication line 606 delivers network data to a third facility 616.

Because this network 600 is distributed over multiple facilities, this network 600 may pose significant challenges in diagnosing faults. To diagnose a fault, the client could establish a connection with remote network monitor 110A, for example via a LAN connection or a cellular connection. The remote network monitor 110A will either directly control the other remote network monitors (110B, 110C, 110D) or will allow the client 104 to control them via remote network monitor 110A. To facilitate this functionality, the remote network monitors connect to one another by a USB connection, optical fiber connection or a wireless connection (e.g., Bluetooth, IR, 802.11). By determining whether the fault is occurring over the PTN or at a specific facility, the customer can save money by sending the proper service team, and only that service team, as soon as the network fault occurs.

In some embodiments a remote network monitor 110 can eavesdrop on data or telephony communications on the remote network under the command of the client 104 or autonomously. Eavesdropping in this respect may include recording telephony or data communications on a memory in the remote network monitor 110, but may also include forwarding the telephony or data communications to the client 104 for analysis. This may be useful for government agencies, such as police departments or intelligence agencies, and for service providers seeking to identify the exact nature of a communications failure.

Figure 7:
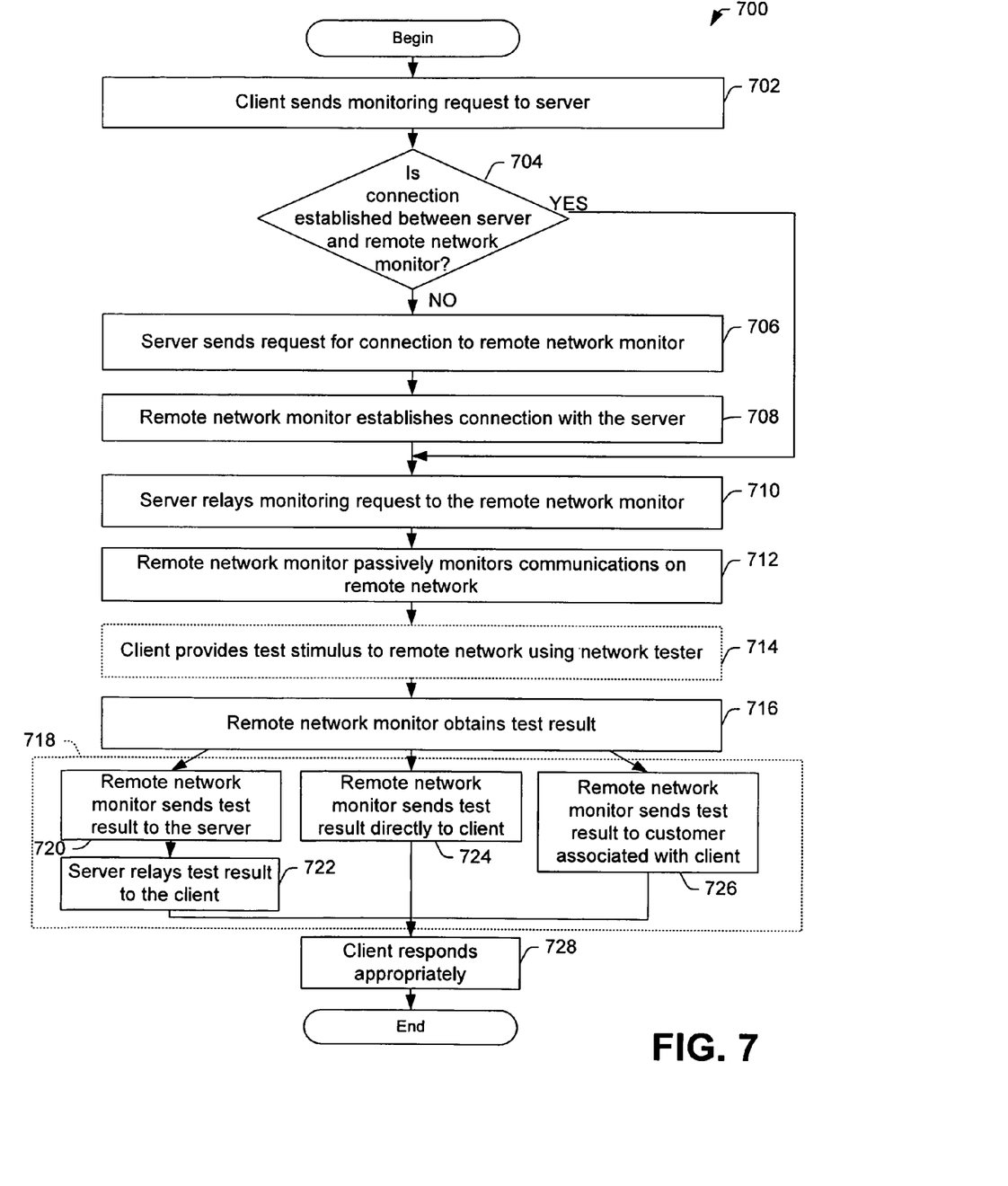
FIG. 7 shows a method where a client monitors a remote network by using a remote network monitor.
Figure 8:
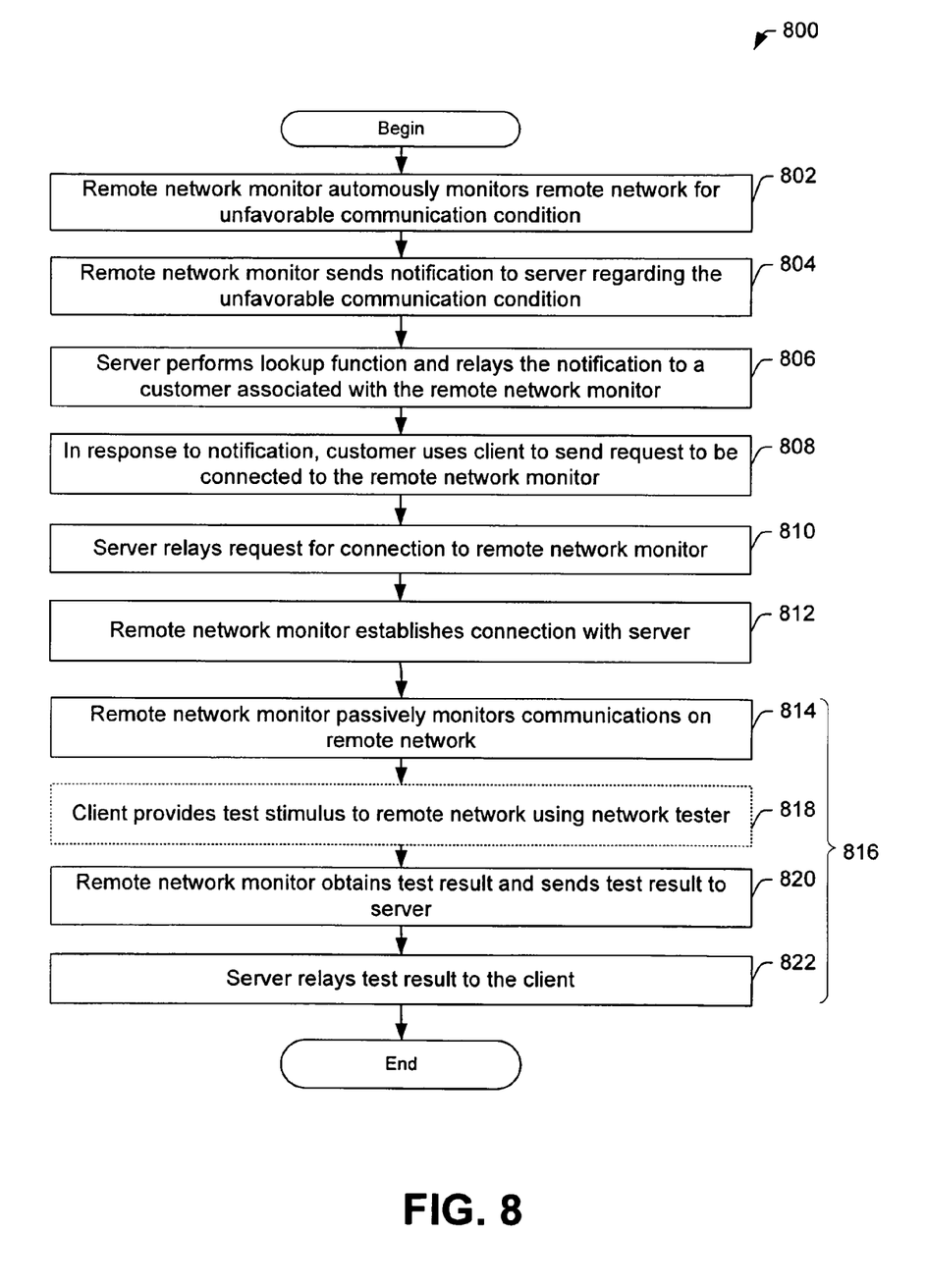
FIG. 8 shows a method where a remote network monitor provides an alarm that notifies a client of an unfavorable network condition.

Now that some illustrative systems have been illustrated and described, reference is made to FIGS. 7-8, which show methodologies for remote network monitoring. While these methods are illustrated as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Further, one or more of the acts depicted herein may be carried out in one or more separate acts and/or phases.

FIG. 7 shows an example of an embodiment of a remote testing mode where the client initiates the connection and controls subsequent tests. The method begins at block 702 where a monitoring request is sent from the client to the server. This monitoring request specifies a facility (or a particular remote network monitor thereat) where the monitoring is to be carried out.

At block 704, a determination is made if a connection is already established with the remote network monitor. If a connection is not established ("NO" at 704), the server sends a request for connection to the remote network monitor at 706. At 708, the remote network monitor responds by establishing a connection with the server.

Once a connection is established between the remote network monitor and the server, the method proceeds to 710 where the server relays the monitoring request to the remote network monitor.

In 712, the remote network monitor passively monitors communications on the remote network without transmitting signals onto the remote network.

In 714, the client optionally provides test stimulus to the remote network using a dedicated network tester that is associated with the remote network.

In 716, the remote network monitor obtains a test result. This test result may be based on the test stimulus or may be based merely on normal traffic flowing through the remote network.

In 718, the remote network monitor directly or indirectly provides the test result to the client. Three possible blocks for achieving this are shown. In 720, for example, the remote network monitor sends the test result to the server. Then in 722 the server relays the test result to the client. In 724, by contrast, the remote network monitor sends the test result directly to the client (e.g., a static IP address of the client). In 726, the remote network monitor sends the test result to a customer associated with the client, such as a network administrator.

In 728, the client takes appropriate action based on the test result. For example, if the test result indicates that an unfavorable communication condition is occurring due to a fault within the remote network, the client can dispatch an IT professional to the remote network to repair the fault.

FIG. 8 shows an example of an embodiment of a remote testing mode where the remote network monitor autonomously and passively monitors the remote network and notifies the customer owning the remote network if a fault is detected. This may be thought of as an "alarm" notification mode.

The method begins at block 802 where a remote network monitor autonomously and passively monitors the remote network. This autonomous monitoring could be initiated at a local interface on the remote network monitor, or could also be initiated at the client. In either case, after being activated, the remote network monitor autonomously monitors the remote network independent of the client and server.

In block 804, the remote network monitor detects the unfavorable communication condition. In response, the remote network monitor transmits a notification to the server that the unfavorable network condition has occurred. In some embodiments, the remote monitor 110 transmits the notification directly to the client (e.g. text message, email or static IP address)

In block 806, the server receives the notification from the remote network monitor. The server then looks-up the customer associated with the particular remote network monitor, and relays the notification to the customer. In some embodiments, this relayed notification will be a text message, pager message, voicemail, email or some other electronic message provided to the customer. In other embodiments, the client can already have a connection established with the server and the server can relay the notification directly to the client.

In block 808 the client receives the notification. Based on the notification, the client sends a connection request to the server. The connection request can specify the particular remote network monitor that detected the unfavorable condition.

In block 810, the server relays the connection requests to the remote network monitor.

In block 812, the remote network monitor establishes a connection with the server.

In block 814, the server relays communications between the client and remote network monitor. In this and other manners, a server provides server-mediated communication between a client and at least one remote network monitor. Thus, in 816, the remote network monitor continuously and passively monitors the remote network and transmits the results to the client via the server.

In 818, the client optionally establishes a connection with a dedicated network tester to generate test stimulus on the remote network. The connection can be established via the server, but could also be a peer-to-peer connection between the client and dedicated network tester.

In 820, the remote network monitor obtains a test result that is based on the test stimulus. The remote network monitor transmits the test result to the server, which in turn relays the test result to the client in block 822. Because the client knows the test stimulus and the test result, the client can accurately determine whether a fault exists on the remote network.

Figure 9:
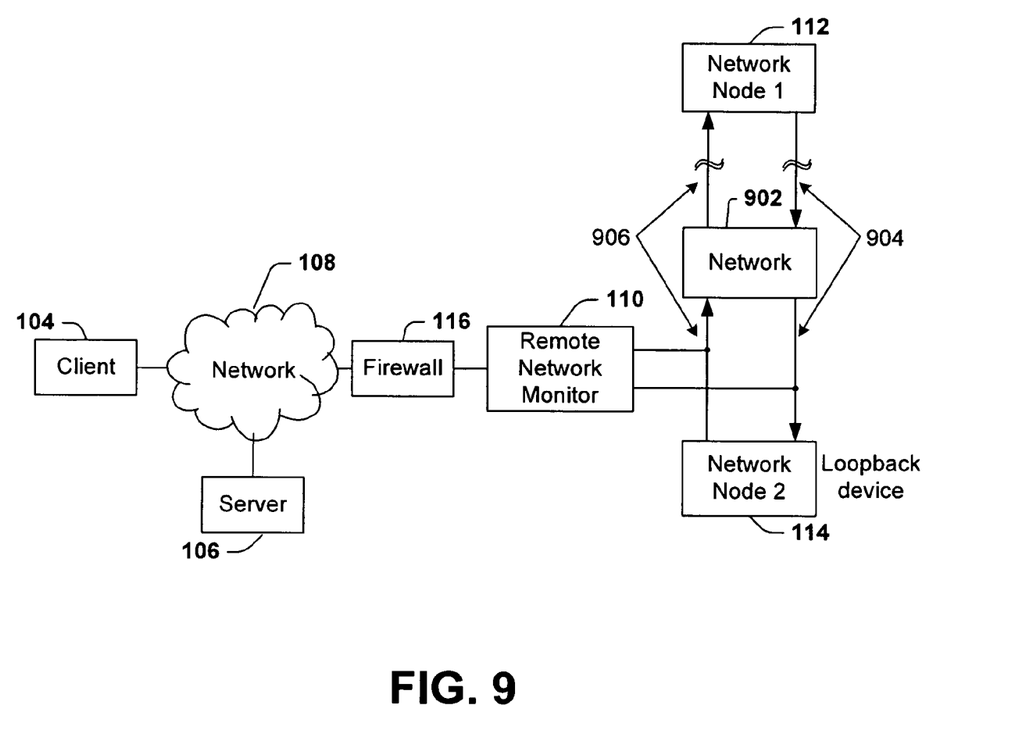
FIG. 9 shows a remote network where loopback testing is in use.
Figure 10:
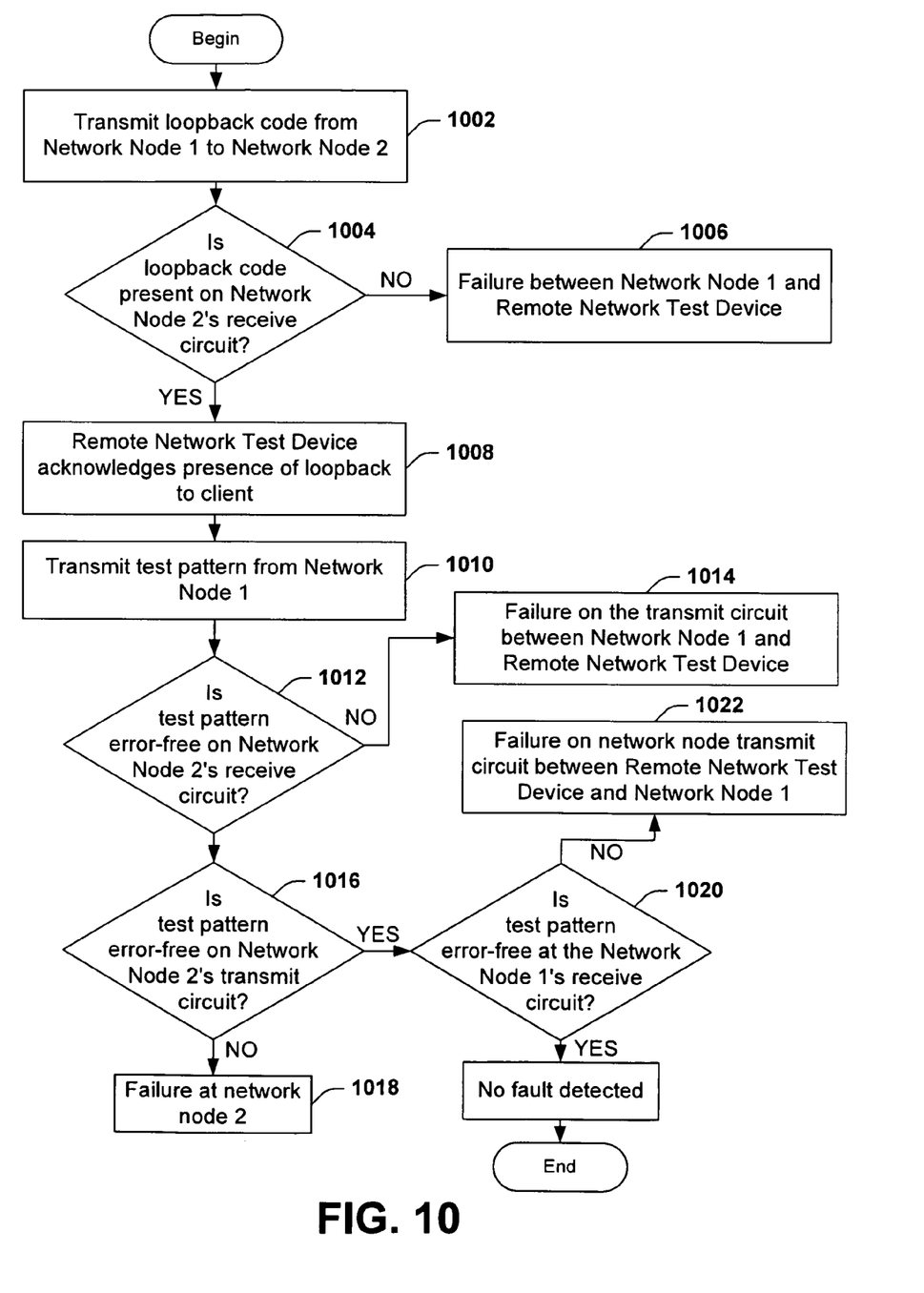
FIG. 10 shows a method for performing loopback testing.

FIGS. 9-10 show embodiments related to a loopback testing mode. FIG. 9 shows a network architecture, and FIG. 10 describes a corresponding methodology.

In FIG. 9, Network Node 1 (112) transmits data through a network 902 (e.g., packet switched or circuit switched network) along a first transmit circuit 904. If no faults are present, Network Node 2 then receives the data at its receiver. Network Node 2 then re-transmits (echoes) the data back through the switched network along a second transmit circuit 906. Again, if no faults are present, Network Node 1 will receive the same data (or some expected permutation) that it transmitted. If a fault occurs in the network and introduces errors, the remote network monitor 110 can help to precisely diagnose the point at which the error occurred.

Referring now to FIG. 10, one can see a method for loopback testing. At 1002, Network Node 1 transmits a loopback code to Network Node 2.

At 1004, the remote network monitor 110 indicates whether it receives the loopback code on the Network Node 2 receive circuit. If not (NO at 1004), the remote network monitor notifies the customer that a failure has occurred on the transmit circuit 904 between Network Node 1 and Network Node 2.

If Network Node 2 receives the loopback code on its receive circuit (YES at 1004), the remote network monitor acknowledges the presence of loopback to the client at 1008.

Then at 1010, the customer requests Network Node 1 to transmit a test pattern from Network Node 1. This request can be made from the client to Network Node 1 directly, from the client to Network Node 1 via the Remote network monitor, or in another manner.

After the test pattern is transmitted by Network Node 1, at 1012 a determination is made by the remote network monitor whether the test pattern is received error-free at Network Node 2's receive circuit. If not (NO at 1012), the system indicates that there is a failure on the transmit circuit between Network Node 1 and the remote network monitor at 1014.

If the test pattern is received error-free (YES at 1012), the method continues to 1016 and determines if the test pattern is received error-free on Network Node 2's transmit circuit. If not (NO at 1016), the system indicates that a fault is occurring at Network Node 2 at 1018.

If the test pattern is received error-free on Network Node 2's transmit circuit (YES at 1016), the method continues to 1020 and determines if the test pattern is received error-free on Network Node 1's receive circuit. If not (NO at 1020), the system indicates an error is occurring on the transmit circuit 906 between the remote network monitor and Network Node 1 at 1022.

While examples of the invention have been illustrated and described with respect to one or more implementations, alterations and/or modifications may be made to the these examples without departing from the spirit and scope of the appended claims. For example, although various illustrated embodiments may be implemented in whole or in part as hardware structures, the functionality and corresponding features of the present system can also be performed by appropriate software routines or a combination of hardware and software. To the extent that a system uses software, the software may be read from a "computer readable medium", which includes any medium that participates in providing instructions to a node or to digital circuitry associated with the node. Such a medium may take numerous forms, including but not limited to, non-volatile media, volatile media, and transmission media. Non-volatile media includes, but is not limited to: magnetic disks, flash disks, EEPROM, and optical disks such as CDs or DVDs. Volatile media includes dynamic memory, including but not limited to: SRAM or DRAM. Transmission media includes, but is not limited to: coaxial cables, copper wire, fiber optics, etc., and busses internal or external to a node. Transmission media can also include electromagnetic waves, such as a voltage wave, light wave, or radio wave.

In regard to the various functions performed by the above described components or structures (blocks, units, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for diagnosing faults in a remote network, comprising:

establishing a preliminary connection between a remote network monitor and a server, wherein the remote network monitor is arranged behind a firewall or network address translation module within the remote network, and wherein the server is located outside of the remote network;

while the preliminary connection is established, triggering the remote network monitor to passively monitor for an error or failure condition within the remote network;

based on whether the remote network monitor does or does not detect an error or failure condition during passive monitoring, correspondingly transmitting or not transmitting an error notification from the remote network monitor to a client;

selectively sending a test request from the client to the server based on whether the error notification is received at the client, where the test request specifies a network tester in the remote network and a test stimulus to be provided by the network tester, wherein the network tester is separate from the remote network monitor;

after the test request is sent, monitoring the remote network via the remote network monitor to determine whether or not the test stimulus to be provided by the network tester results in an error or failure condition on the remote network;

determining whether a test result indicative of an error or failure condition is received from the remote network monitor at the client; wherein the test result, if received, correlates to the test stimulus to be provided by the network tester.

2. The method of claim 1, wherein the error or failure condition is reported from the remote network monitor to the client via the server.

3. The method of claim 1, wherein the error or failure condition is reported from the remote network monitor to the client via a cellular phone network.

4. The method of claim 3, wherein the remote network monitor does not transmit a signal into the remote network while the method is being carried out.

* * * * *